US012384869B2

(12) United States Patent
Vogelsang et al.

(10) Patent No.: US 12,384,869 B2
(45) Date of Patent: Aug. 12, 2025

(54) PROCESS FOR PREPARING A POLYOXYALKYLENE CARBONATE POLYOL

(71) Applicant: Covestro Deutschland AG, Leverkusen (DE)

(72) Inventors: Elisabeth Vogelsang, Cologne (DE); Joerg Hofmann, Krefeld (DE); Klaus Lorenz, Dormagen (DE); Philipp Sander, Grevenbroich (DE); Stefan Werda, Jüchen (DE); Mike Schuetze, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 583 days.

(21) Appl. No.: 17/912,606

(22) PCT Filed: Mar. 26, 2021

(86) PCT No.: PCT/EP2021/057877
§ 371 (c)(1),
(2) Date: Sep. 19, 2022

(87) PCT Pub. No.: WO2021/198054
PCT Pub. Date: Oct. 7, 2021

(65) Prior Publication Data
US 2023/0174705 A1 Jun. 8, 2023

(30) Foreign Application Priority Data

Apr. 2, 2020 (EP) .................................... 20167776

(51) Int. Cl.
| C08G 18/44 | (2006.01) |
| C08G 18/10 | (2006.01) |
| C08G 18/48 | (2006.01) |
| C08G 64/18 | (2006.01) |
| C08G 65/26 | (2006.01) |
| C08G 65/332 | (2006.01) |

(52) U.S. Cl.
CPC ............ *C08G 18/44* (2013.01); *C08G 18/10* (2013.01); *C08G 18/4845* (2013.01); *C08G 64/183* (2013.01); *C08G 65/2606* (2013.01); *C08G 65/2663* (2013.01); *C08G 65/2672* (2013.01); *C08G 65/3328* (2013.01); *C08G 2261/126* (2013.01)

(58) Field of Classification Search
CPC ................ C08G 18/44; C08G 18/4825; C08G 18/4829; C08G 65/2606
See application file for complete search history.

(56) References Cited

U.S. PATENT DOCUMENTS

| 3,404,109 A | 10/1968 | Milgrom |
| 3,829,505 A | 8/1974 | Johnston |
| 3,941,849 A | 3/1976 | Herold |
| 5,158,922 A | 10/1992 | Hinney et al. |
| 5,470,813 A | 11/1995 | Le-Khac |
| 5,482,908 A | 1/1996 | Le-Khac |
| 5,545,601 A | 8/1996 | Le-Khac |
| 5,627,120 A | 5/1997 | Le-Khac |
| 5,712,216 A | 1/1998 | Le-Khac |
| 5,714,428 A | 2/1998 | Le-Khac |
| 6,780,813 B1 | 8/2004 | Hofmann et al. |
| 6,806,345 B2 | 10/2004 | Hofmann et al. |
| 7,008,900 B1 | 3/2006 | Hofmann et al. |
| 7,304,172 B2 | 12/2007 | Coates et al. |
| 2003/0158449 A1 | 8/2003 | Hofmann et al. |
| 2012/0165549 A1 | 6/2012 | Ok et al. |
| 2012/0196999 A1 | 8/2012 | Nefzger et al. |
| 2014/0018517 A1 | 1/2014 | Busygin et al. |
| 2014/0163197 A1 | 6/2014 | Quintanilla et al. |
| 2022/0033575 A1 | 2/2022 | Vogelsang et al. |

FOREIGN PATENT DOCUMENTS

| EP | 3783044 A1 | 2/2021 |
| EP | 3783046 A1 | 2/2021 |
| JP | 4145123 B2 | 9/2008 |

OTHER PUBLICATIONS

Allen et al., "High-Activity, Single-Site Catalysts for the Alternating Copolymerization of CO2 and Propylene Oxide," Journal of the American Chemical Society, Dec. 2002, vol. 124, No. 48, pp. 14284-14285.
Chisholm et al., "Poly(propylene carbonate). 1. More about Poly-(propylene carbonate) Formed from the Copolymerization of Propylene Oxide and Carbon Dioxide Employing a Zinc Glutarate Catalyst," Macromolecules, 2002, vol. 35, No. 17, pp. 6494-6504.
International Search Report in PCT/EP2021/057877, date of mailing: Jul. 19, 2021, Authorized officer: Delphine Pouilley.
Kember et al., "Catalysts for CO2/epoxide copolymerisation," Chemical Communications, 2011, vol. 47, Issue 1, pp. 141-163.
Rokicki, G., "Aliphatic cyclic carbonates and spiroorthocarbonates as monomers," Progress in Polymer Science, Mar. 2000, vol. 25, Issue 2, pp. 259-342.

*Primary Examiner* — Wenwen Cai
(74) *Attorney, Agent, or Firm* — Donald R. Palladino

(57) ABSTRACT

The invention relates to a process for preparing a polyoxyalkylene carbonate polyol by reacting a polyoxyalkylene polyol with a cyclic carbonate in the presence of an amine catalyst. The invention further relates to polyoxyalkylene carbonate polyols obtainable using the method according to the invention and to a process for preparing polyurethanes by reacting the polyoxyalkylene carbonate polyols according to the invention with polyisocyanates.

13 Claims, No Drawings

PROCESS FOR PREPARING A POLYOXYALKYLENE CARBONATE POLYOL

CROSS-REFERENCE TO RELATED APPLICATION

This application is a national stage application under 35 U.S.C. § 371 of PCT/EP2021/057877, filed Mar. 26, 2021, which claims the benefit of European Application No. 20167776.2, filed Apr. 2, 2020, which is incorporated herein by reference.

FIELD

The invention provides a process for preparing a polyoxyalkylenecarbonate polyol by reacting a polyoxyalkylene polyol with a cyclic carbonate in the presence of an amine catalyst. The invention further provides polyoxyalkylenecarbonate polyols obtainable by the process of the invention and a process for preparing polyurethanes by reacting the polyoxyalkylenecarbonate polyols of the invention with polyisocyanates.

BACKGROUND

As yet unpublished WO application PCT/EP2019/086092 discloses a process for preparing a polyoxyalkylene polyester polyol by reaction of a polyoxyalkylene polyol with a lactone in the presence of a Bronsted-acidic catalyst, wherein the catalyst has a pKa of 1 or less, wherein the number-average molar mass of the polyoxyalkylene polyol is ≥1000 g/mol, preferably ≥1500 g/mol, more preferably ≥2000 g/mol, and wherein in the lactone a $CH_2$ group is bonded to the ring oxygen.

WO 2011/000560 A1 discloses a process for preparing polyether ester polyols having primary hydroxyl end groups, comprising the steps of reacting a starter compound comprising active hydrogen atoms with an epoxide under double metal cyanide catalysis, reacting the product obtained with a cyclic carboxylic anhydride and reacting this product obtained with ethylene oxide in the presence of a catalyst comprising at least one nitrogen atom per molecule with the exception of acyclic, identically substituted tertiary amines. The resulting polyetherester polyols from this multistage process have a proportion of primary hydroxyl groups of at most 76%.

As yet unpublished EP applications EP 19192406.7 and EP 19192409.1 disclose the reaction of usually short-chain H-functional starter compounds with cyclic carbonates, such as cyclic ethylene carbonate and/or cyclic propylene carbonate, in the presence of vanadate or tungstate catalysts.

WO2013/028437 A1 discloses a process for preparing polyether polyols containing oxyethylene units by addition of ethylene carbonate onto H-functional starter compounds in the presence of double metal cyanide catalysts, wherein the working examples describe the reaction of a polypropylene oxide triol having a molar mass of 700 g/mol with a mixture of propylene oxide and ethylene carbonate in the presence of double metal cyanide catalysts. The resulting polyether polyol products have primary hydroxyl group contents of 8.2% to 15.9%.

SUMMARY

Proceeding from the prior art, it was therefore an object of the present invention to provide a simplified, ideally one-stage, process for preparing polyoxyalkylenecarbonate polyols having a primary hydroxyl group content of ≥65% based on the sum total of primary and secondary terminal hydroxyl groups, since these primary hydroxyl groups are more reactive in the subsequent conversion to polyurethanes, which is essential for various polyurethane production methods, for example for flexible polyurethane foam production methods.

In addition, this process was to use minimal amounts of a highly reactive, heavy metal-free catalyst, meaning that it is preferably not necessary to remove the catalyst prior to further processing. Furthermore, the use of the process of the invention shall also make it possible to react starter compounds having primarily or exclusively secondary hydroxyl end groups, resulting in polyoxyalkylenecarbonate polyols having a proportion of primary hydroxyl groups of ≥65%, based on the sum total of primary and secondary terminal hydroxyl groups. At the same time, the increase in viscosity of the resulting product as a result of the chain extension and the incorporation of further functional groups, for example ether groups or else carbonate groups, shall be lower than for process products having comparable equivalent weight from the prior art. A significant increase in viscosity of the polyol products usually results in poorer or more complex further processing to give polyurethane conversion products.

It has been found that, surprisingly, the technical object is achieved by a process for preparing a polyoxyalkylenecarbonate polyol, preferably a polyethercarbonate polyol, by reacting a polyoxyalkylene polyol, preferably a polyether polyol, with a cyclic carbonate in the presence of an amine catalyst.

DETAILED DESCRIPTION

In the process of the invention, a polyoxyalkylenecarbonate polyol is understood to mean the reaction product of a polyoxyalkylene polyol with a cyclic carbonate, wherein the polyoxyalkylenecarbonate polyol comprises a polyoxyalkylene block (A) and at least one polyethercarbonate block (B). The polyoxyalkylene polyol here, as well as at least two terminal hydroxyl groups, also includes oxyalkylene groups, such as ether groups and/or carbonate groups Amine-catalyzed reaction of this polyoxyalkylene polyol with the cyclic carbonate forms not only the polyoxyalkylene block (A) based on the polyoxyalkylene polyol but also at least one polyethercarbonate block (B), wherein the linear carbonate groups of block (B) are formed by ring opening of the cyclic carbonate. The polyether groups of block (B) result from ring opening of the cyclic carbonate and subsequent decarboxylation (of the carbonate groups) in block (B). The resulting polyoxyalkylenecarbonate polyol of the invention additionally has terminal hydroxyl groups. In the case of the preferred polyethercarbonate polyol, this is the reaction product of a polyether polyol with a cyclic carbonate in the presence of an amine catalyst.

In one embodiment of the process of the invention, the number-average molar mass of the polyoxyalkylene polyol, preferably the polyether polyol, is ≥200 g/mol, preferably ≥1000 g/mol, more preferably ≥1500 g/mol, most preferably ≥2000 g/mol, where the number-average molar mass is determined by means of gel permeation chromatography (GPC) as disclosed in the experimental.

In one embodiment of the process of the invention, the number-average molar mass of the polyoxyalkylene polyol, preferably the polyether polyol, is ≤30000 g/mol, preferably ≤25000 g/mol, more preferably ≤20000 g/mol, most preferably ≤15000 g/mol, where the number-average molar mass is determined by means of gel permeation chromatography (GPC) as disclosed in the experimental.

In an embodiment of the process of the invention, the number-average molar mass of the polyoxyalkylene polyol, preferably the polyether polyol, is ≥200 g/mol to ≤30000 g/mol, preferably ≥1000 g/mol to ≤25000 g/mol, more preferably ≥1500 g/mol to ≤20000 g/mol and most preferably ≥2000 g/mol to ≤15000 g/mol.

The polyoxyalkylene polyol, preferably the polyether polyol, generally has an OH functionality (i.e. the number of hydrogen atoms active in respect of the polymerization per molecule) of 2 to 8, preferably of 2 to 6 and more preferably of 2 to 4. The polyoxyalkylene polyol, preferably the polyether polyol, can be used either individually or as a mixture of at least two polyoxyalkylene polyols, preferably two polyether polyols.

Polyoxyalkylene polyols of the invention are polyether polyols and/or polyethercarbonate polyols.

In one embodiment of the process of the invention, the polyoxyalkylene polyol, preferably the polyether polyol, has a proportion of secondary OH end groups of at least 75%, based on the sum total of primary and secondary OH end groups, wherein the secondary OH end groups have been determined by means of 1H NMR spectroscopy as disclosed in the experimental section.

In one embodiment of the invention, the polyoxyalkylene polyols may be selected from the substance class of the polyether polyols. Preference is given to polyether polyols formed from repeat ethylene oxide and propylene oxide units, preferably having a proportion of propylene oxide units of 50% to 100%, more preferably having a proportion of propylene oxide units of 80% to 100%. These may be random copolymers, gradient copolymers, alternating copolymers or block copolymers of ethylene oxide and propylene oxide. Suitable polyether polyols formed from repeat propylene oxide and/or ethylene oxide units are for example the Desmophen®, Acclaim®, Arcol®, Baycoll®, Bayfill®, Bayflex®, Baygal®, PET® and polyether polyols from Covestro AG (e.g. Desmophen® 3600Z, Desmophen® 1900U, Acclaim® Polyol 2200, Acclaim® Polyol 4000I, Arcol® Polyol 1010, Arcol® Polyol 1030, Arcol® Polyol 1070, Baycoll® BD 1110, Bayfill® VPPU 0789, Baygal® K55, Polyether® S180). Further suitable homopolypropylene oxides are for example the Pluriol® P products from BASF SE; suitable mixed copolymers of ethylene oxide and propylene oxide are for example the Pluronic® PE or Pluriol® RPE products from BASF SE.

In a further embodiment of the invention, the polyoxyalkylene polyols may be selected from the substance class of the polyethercarbonate polyols (e.g. Cardyon® polyols from Covestro). In particular, polyethercarbonate polyols may be obtained by reaction of alkylene oxides, preferably ethylene oxide, propylene oxide or mixtures thereof, optionally further comonomers, with CO2 in the presence of an H-functional starter substance and using catalysts. These catalysts include double metal cyanide catalysts (DMC catalysts) and/or metal complex catalysts for example based on the metals zinc and/or cobalt, for example zinc glutarate catalysts (described for example in M. H. Chisholm et al., Macromolecules 2002, 35, 6494), so-called zinc diiminate catalysts (described for example in S. D. Allen, J. Am. Chem. Soc. 2002, 124, 14284) and so-called cobalt salen catalysts (described for example in U.S. Pat. No. 7,304,172 B2, US 2012/0165549 A1) and/or manganese salen complexes. An overview of the known catalysts for the copolymerization of alkylene oxides and CO2 may be found for example in Chemical Communications 47 (2011) 141-163.

The use of different catalyst systems, reaction conditions and/or reaction sequences results here in the formation of random, alternating, block-type or gradient-type polyethercarbonate polyols. To this end, these polyethercarbonate polyols may be prepared beforehand in a separate reaction step.

In one embodiment of the process of the invention, the polyoxyalkylene polyol is a polyether polyol and/or polyethercarbonate polyol, preferably a polyether polyol.

In a preferred embodiment of the process of the invention, the polyoxyalkylene polyol is a polyether polyol, wherein the polyether polyol has been prepared by reaction of an H-functional starter substance with alkylene oxides in the presence of a double metal cyanide catalyst. The products obtained after reaction with the cyclic carbonate are referred to hereinafter as polyethercarbonate polyols.

In one embodiment of the process of the invention, the number-average molar mass of the polyether polyol is ≥200 g/mol, preferably ≥1000 g/mol, more preferably ≥1500 g/mol, most preferably ≥2000 g/mol, where the number-average molar mass is determined by means of gel permeation chromatography (GPC) as disclosed in the experimental.

In one embodiment of the process of the invention, the number-average molar mass of the polyether polyol is ≤30000 g/mol, preferably ≤25000 g/mol, more preferably ≤20000 g/mol, most preferably ≤15000 g/mol, where the number-average molar mass is determined by means of gel permeation chromatography (GPC) as disclosed in the experimental.

In a preferred embodiment of the process of the invention, the number-average molar mass of the polyether polyol is ≥200 g/mol to ≤30000 g/mol, preferably ≥1000 g/mol to ≤25000 g/mol, more preferably ≥1500 g/mol to ≤20000 g/mol and most preferably ≥2000 g/mol to ≤15000 g/mol.

In a further preferred embodiment of the process according to the invention, the polyoxyalkylene polyol is a polyethercarbonate polyol, wherein the polyethercarbonate polyol has been prepared by reaction of an H-functional starter substance with alkylene oxides and carbon dioxide in the presence of a double metal cyanide catalyst. The products obtained after reaction with the cyclic carbonate are referred to hereinafter as polyethercarbonate polyols.

In one embodiment of the process of the invention, the number-average molar mass of the polyethercarbonate polyol is ≥200 g/mol, preferably ≥1000 g/mol, more preferably ≥1500 g/mol, most preferably ≥2000 g/mol, where the number-average molar mass is determined by means of gel permeation chromatography (GPC) as disclosed in the experimental.

In one embodiment of the process of the invention, the number-average molar mass of the polyethercarbonate polyol is ≤30000 g/mol, preferably ≤25000 g/mol, more preferably ≤20000 g/mol, most preferably ≤15000 g/mol, where the number-average molar mass is determined by means of gel permeation chromatography (GPC) as disclosed in the experimental.

In a preferred embodiment of the process of the invention, the number-average molar mass of the polyethercarbonate polyol is ≥200 g/mol to ≤30000 g/mol, preferably ≥1000 g/mol to ≤25000 g/mol, more preferably ≥1500 g/mol to ≤20000 g/mol and most preferably ≥2000 g/mol to ≤15000 g/mol.

The DMC catalysts usable with preference in the process of the invention contain double metal cyanide compounds which are the reaction products of water-soluble metal salts and water-soluble metal cyanide salts.

Double metal cyanide (DMC) catalysts for use in the homopolymerization of alkylene oxides are known in principle from the prior art (see, for example, U.S. Pat. Nos. 3,404,109, 3,829,505, 3,941,849 and 5,158,922). DMC catalysts described, for example, in U.S. Pat. No. 5,470,813, EP-A 700 949, EP-A 743 093, EP-A 761 708, WO 97/40086, WO 98/16310 and WO 00/47649 have a very high activity and enable the preparation of polyoxyalkylene polyols at very low catalyst concentrations. A typical example is that of the highly active DMC catalysts described in EP-A 700 949 which, as well as a double metal cyanide compound (e.g. zinc hexacyanocobaltate(III)) and an organic complex ligand (e.g. tert-butanol), also contain a polyether having a number-average molecular weight greater than 500 g/mol.

The DMC catalysts which can be used in accordance with the invention are preferably obtained by (1.) in a first step, reacting an aqueous solution of a metal salt with the aqueous solution of a metal cyanide salt in the presence of one or more organic complex ligands, e.g. an ether or alcohol, (2.) in a second step, using known techniques (such as centrifugation or filtration) to remove the solid from the suspension obtained from (1.), (3.) optionally, in a third step, washing the isolated solid with an aqueous solution of an organic complex ligand (for example by resuspension and subsequent reisolation by filtration or centrifugation), (4.) and subsequently drying the solid obtained at temperatures of in general 20-120° C. and at pressures of in general 0.1 mbar to atmospheric pressure (1013 mbar), optionally after pulverizing, wherein in the first step or immediately after the precipitation of the double metal cyanide compound (second step) one or more organic complex ligands, preferably in excess (based on the double metal cyanide compound), and optionally further complex-forming components are added.

The double metal cyanide compounds present in the DMC catalysts that can be used in accordance with the invention are the reaction products of water-soluble metal salts and water-soluble metal cyanide salts.

By way of example, an aqueous zinc chloride solution (preferably in excess relative to the metal cyanide salt) and potassium hexacyanocobaltate are mixed and then dimethoxyethane (glyme) or tert-butanol (preferably in excess, relative to zinc hexacyanocobaltate) is added to the resulting suspension.

Metal salts suitable for preparing the double metal cyanide compounds preferably have a composition according to the general formula (I), $$M(X)_n \qquad (I),$$

where
M is selected from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$; is preferably $Zn^{2+}$, $Fe^{2+}$, $Co^{2+}$ or $Ni^{2+}$, X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;

n is 1 if X=sulfate, carbonate or oxalate and n is 2 if X=halide, hydroxide, carboxylate, cyanate, thiocyanate, isocyanate, isothiocyanate or nitrate, or suitable metal salts preferably have a composition according to the general formula (II)

$$M_r(X)_3 \qquad (II)$$

where
M is selected from the metal cations $Fe^{3+}$, $Al^{3+}$, $Co^{3+}$ and $Cr^{3+}$, X comprises one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;

r is 2 if X=sulfate, carbonate or oxalate and r is 1 if X=halide, hydroxide, carboxylate, cyanate, thiocyanate, isocyanate, isothiocyanate or nitrate, or suitable metal salts preferably have a composition according to the general formula (III)

$$M(X)_s \qquad (III),$$

where
M is selected from the metal cations $Mo^{4+}$, $V^{4+}$ and $W^{4+}$,

X comprises one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;

s is 2 if X=sulfate, carbonate or oxalate and s is 4 if X=halide, hydroxide, carboxylate, cyanate, thiocyanate, isocyanate, isothiocyanate or nitrate, or suitable metal salts preferably have a composition according to the general formula (IV)

$$M(X)_t \qquad (IV),$$

where
M is selected from the metal cations $Mo^{6+}$ and $W^{6+}$,

X comprises one or more (i.e. different) anions, preferably anions selected from the group of halides (i.e. fluoride, chloride, bromide, iodide), hydroxide, sulfate, carbonate, cyanate, thiocyanate, isocyanate, isothiocyanate, carboxylate, oxalate and nitrate;

t is 3 if X=sulfate, carbonate or oxalate and t is 6 if X=halide, hydroxide, carboxylate, cyanate, thiocyanate, isocyanate, isothiocyanate or nitrate.

Examples of suitable metal salts are zinc chloride, zinc bromide, zinc iodide, zinc acetate, zinc acetylacetonate, zinc benzoate, zinc nitrate, iron(II) sulfate, iron(II) bromide, iron(II) chloride, iron(III) chloride, cobalt(II) chloride, cobalt(II) thiocyanate, nickel(II) chloride and nickel(II) nitrate. It is also possible to use mixtures of different metal salts.

Metal cyanide salts suitable for preparing the double metal cyanide compounds preferably have a composition according to the general formula (V)

$$(Y)_a M'(CN)_b (A)_c \qquad (V),$$

where
M' is selected from one or more metal cations from the group consisting of Fe(II), Fe(III), Co(II), Co(III), Cr(II), Cr(III), Mn(II), Mn(III), Ir(III), Ni(II), Rh(III), Ru(II), V(IV) and V(V); M' is preferably one or more metal cations from the group consisting of Co(II), Co(III), Fe(II), Fe(III), Cr(III), Ir(III) and Ni(II), Y is selected from one or more metal cations from the group consisting of alkali metal (i.e. $Li^+$, $Na^+$, $K^+$, $Rb^+$) and alkaline earth metal (i.e. $Be^{2+}$, $Mg^{2+}$, $Ca^{2+}$, $Sr^{2+}$, $Ba^{2+}$), A is selected from one or more anions from the group consisting of halides (i.e. fluoride, chloride, bromide, iodide), hydroxide, sulfate, carbonate, cyanate, thiocyanate, isocyanate, isothiocyanate, carboxylate, azide, oxalate or nitrate, and a, b and c are integers, where the values for a, b and c are selected such as to ensure electronic neutrality of the metal cyanide salt; a is preferably 1, 2, 3 or 4; b is preferably 4, 5 or 6; c preferably has the value 0.

Examples of suitable metal cyanide salts are sodium hexacyanocobaltate(III), potassium hexacyanocobaltate (III), potassium hexacyanoferrate(II), potassium hexacyanoferrate(III), calcium hexacyanocobaltate(III) and lithium hexacyanocobaltate(III).

Preferred double metal cyanide compounds present in the DMC catalysts which can be used in accordance with the invention are compounds having compositions according to the general formula (VI)

$$M_x[M'_{x'}(CN)_y]_z \quad (VI),$$

in which M is as defined in the formulae (I) to (IV) and M' is as defined in formula (V), and x, x', y and z are integers and are selected such as to ensure electronic neutrality of the double metal cyanide compound.

Preferably, x=3, x'=1, y=6 and z=2,

M=Zn(II), Fe(II), Co(II) or Ni(II) and

M'=Co(III), Fe(III), Cr(III) or Ir(III).

Examples of suitable double metal cyanide compounds (VI) are zinc hexacyanocobaltate(III), zinc hexacyanoiridate (III), zinc hexacyanoferrate(III) and cobalt(II) hexacyanocobaltate(III). Further examples of suitable double metal cyanide compounds can be found, for example, in U.S. Pat. No. 5,158,922 (column 8, lines 29-66). With particular preference it is possible to use zinc hexacyanocobaltate(III).

The organic complex ligands which can be added in the preparation of the DMC catalysts are disclosed in, for example, U.S. Pat. No. 5,158,922 (see, in particular, column 6, lines 9 to 65), U.S. Pat. Nos. 3,404,109, 3,829,505, 3,941,849, EP-A 700 949, EP-A 761 708, JP 4 145 123, U.S. Pat. No. 5,470,813, EP-A 743 093 and WO-A 97/40086). The organic complex ligands used are, for example, water-soluble organic compounds containing heteroatoms such as oxygen, nitrogen, phosphorus or sulfur, which can form complexes with the double metal cyanide compound. Preferred organic complex ligands are alcohols, aldehydes, ketones, ethers, esters, amides, ureas, nitriles, sulfides and mixtures thereof. Particularly preferred organic complex ligands are aliphatic ethers (such as dimethoxyethane), water-soluble aliphatic alcohols (such as ethanol, isopropanol, n-butanol, isobutanol, sec-butanol, tert-butanol, 2-methyl-3-buten-2-ol and 2-methyl-3-butyn-2-ol), compounds which include both aliphatic or cycloaliphatic ether groups and aliphatic hydroxyl groups (such as ethylene glycol mono-tert-butyl ether, diethylene glycol mono-tert-butyl ether, tripropylene glycol monomethyl ether and 3-methyl-3-oxetanemethanol, for example). Extremely preferred organic complex ligands are selected from one or more compounds of the group consisting of dimethoxyethane, tert-butanol 2-methyl-3-buten-2-ol, 2-methyl-3-butyn-2-ol, ethylene glycol mono-tert-butyl ether and 3-methyl-3-oxetanemethanol.

In the preparation of the DMC catalysts which can be used in accordance with the invention, there is optional use of one or more complex-forming components from the compound classes of the polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkylacrylates, polyalkylmethacrylates, polyvinyl methyl ether, polyvinyl ethyl ether, polyvinyl acetate, polyvinyl alcohol, poly-N-vinylpyrrolidone, poly (N-vinylpyrrolidone-co-acrylic acid), polyvinyl methyl ketone, poly(4-vinylphenol), poly(acrylic acid-co-styrene), oxazoline polymers, polyalkyleneimines, maleic acid copolymers and maleic anhydride copolymers, hydroxyethylcellulose and polyacetals, or of the glycidyl ethers, glycosides, carboxylic esters of polyhydric alcohols, bile acids or salts, esters or amides thereof, cyclodextrins, phosphorus compounds, α,β-unsaturated carboxylic esters, or ionic surface-active or interface-active compounds.

In the preparation of the DMC catalysts which can be used in accordance with the invention, preference is given to using the aqueous solutions of the metal salt (e.g. zinc chloride) in the first step in a stoichiometric excess (at least 50 mol %) relative to the metal cyanide salt. This corresponds to at least a molar ratio of metal salt to metal cyanide salt of 2.25:1.00. The metal cyanide salt (e.g. potassium hexacyanocobaltate) is reacted in the presence of the organic complex ligand (e.g. tert-butanol), and a suspension is formed which comprises the double metal cyanide compound (e.g. zinc hexacyanocobaltate), water, excess metal salt, and the organic complex ligand.

The organic complex ligand may be present here in the aqueous solution of the metal salt and/or the metal cyanide salt, or it is added directly to the suspension obtained after precipitation of the double metal cyanide compound. It has been found to be advantageous to mix the metal salt and the metal cyanide salt aqueous solutions and the organic complex ligand by stirring vigorously. Optionally, the suspension formed in the first step is subsequently treated with a further complex-forming component. This complex-forming component is preferably used in a mixture with water and organic complex ligand. A preferred process for performing the first step (i.e. the preparation of the suspension) is effected using a mixing nozzle, more preferably using a jet disperser, as described, for example, in WO-A 01/39883.

In the second step, the solid (i.e. the precursor of the catalyst) can be isolated from the suspension by known techniques, such as centrifugation or filtration.

In a preferred variant, the isolated solid is then washed with an aqueous solution of the organic complex ligand (for example by resuspension and subsequent reisolation by filtration or centrifugation) in a third process step. In this way, for example, water-soluble by-products, such as potassium chloride, can be removed from the catalyst that can be used in accordance with the invention. The amount of the organic complex ligand in the aqueous wash solution is preferably between 40% and 80% by weight, based on the overall solution.

Optionally in the third step the aqueous wash solution is admixed with a further complex-forming component, preferably in the range between 0.5% and 5% by weight, based on the overall solution.

It is also advantageous to wash the isolated solid more than once. Preferably, in a first wash step (3.-1), an aqueous solution of the organic complex ligand is used for washing (for example by resuspension and subsequent reisolation by filtration or centrifugation), in order in this way to remove, for example, water-soluble by-products such as potassium chloride from the catalyst which can be used in accordance with the invention. It is particularly preferable when the amount of the organic complex ligand in the aqueous wash solution is between 40% and 80% by weight based on the overall solution for the first wash step. In the further wash steps (3.-2), either the first wash step is repeated once or more than once, preferably once to three times, or, preferably, a nonaqueous solution, for example a mixture or solution of organic complex ligands and further complex-forming component (preferably in the range between 0.5% and 5% by weight, based on the total amount of the wash solution in the step(3.-2)), is used as a wash solution to wash the solid once or more than once, preferably once to three times.

The isolated and optionally washed solid can then be dried, optionally after pulverization, at temperatures of 20-100° C. and at pressures of 0.1 mbar to standard pressure (1013 mbar).

A preferred method of isolating the DMC catalysts usable in accordance with the invention from the suspension by filtration, filtercake washing and drying is described in WO-A 01/80994.

Suitable H-functional starter substances (starters) used may be compounds having hydrogen atoms that are active in respect of the alkoxylation. One example of a group having active hydrogen atoms that is active in respect of the alkoxylation is —OH. H-functional starter substances selected may, for example, be one or more compounds selected from the group comprising polyhydric alcohols, polyether polyols and polyethercarbonate polyols.

Examples of polyhydric alcohols suitable as H-functional starter substances are dihydric alcohols (for example ethylene glycol, diethylene glycol, 1,2-propylene glycol, dipropylene glycol, propane-1,3-diol, butane-1,4-diol, butene-1,4-diol, butyne-1,4-diol, neopentyl glycol, pentanetane-1,5-diol, methylpentanediols (for example 3-methylpentane-1,5-diol), hexane-1,6-diol, octane-1,8-diol, decane-1,10-diol, dodecane-1,12-diol, bis(hydroxymethyl)cyclohexanes (for example 1,4-bis(hydroxymethyl)cyclohexane), triethylene glycol, tetraethylene glycol, polyethylene glycols, dipropylene glycol, tripropylene glycol, polypropylene glycols, dibutylene glycol and polybutylene glycols); trihydric alcohols (for example trimethylolpropane, glycerol, trishydroxyethyl isocyanurate, castor oil); tetrahydric alcohols (for example pentaerythritol); polyalcohols (for example sorbitol, hexitol, sucrose, starch, starch hydrolyzates, cellulose, cellulose hydrolyzates, hydroxy-functionalized fats and oils, especially castor oil), and also all modification products of these aforementioned alcohols with different amounts of ε-caprolactone.

The H-functional starter substances may also be selected from the substance class of the polyether polyols, especially those having a molecular weight $M_n$ in the range from 100 to 1000 g/mol. Preference is given to polyether polyols formed from repeat ethylene oxide and propylene oxide units, preferably having a proportion of propylene oxide units of 35% to 100%, more preferably having a proportion of propylene oxide units of 50% to 100%. These may be random copolymers, gradient copolymers, alternating copolymers or block copolymers of ethylene oxide and propylene oxide. Examples of suitable polyether polyols formed from repeat propylene oxide and/or ethylene oxide units include Desmophen®, Acclaim®, Arcol®, Baycoll®, Bayfill®, Bayflex®, Baygal®, PET® and polyether polyols from Covestro AG (PET® 1004, PET® 1110N). Further suitable homopolypropylene oxides are for example the Pluriol® P products from BASF SE, suitable mixed copolymers of ethylene oxide and propylene oxide are for example the Pluronic® PE or Pluriol® RPE products from BASF SE.

The H-functional starter substances generally have an OH functionality (i.e. the number of hydrogen atoms active in respect of the polymerization per molecule) of 2 to 8, preferably of 2 to 6 and more preferably of 2 to 4. The H-functional starter substances are used either individually or as a mixture of at least two H-functional starter substances.

Preferred H-functional starter substances are ethylene glycol, propylene glycol, diethylene glycol, trimethylolpropane, glycerol, sorbitol, polyether polyols and polyethercarbonate polyols.

In a preferred embodiment of the process of the invention, the alkylene oxide is ethylene oxide and/or propylene oxide.

In a preferred embodiment of the process of the invention, the proportion by weight of propylene oxide is 80% by weight to 100% by weight based on the sum total of the masses of propylene oxide and of ethylene oxide metered in.

In accordance with general technical understanding in organic chemistry, cyclic carbonates are understood to mean heterocyclic compounds, wherein the carbonate is a cyclic ester of dibasic carbonic acid and an at least difunctional alcohol (carbonic ester). In industry, cyclic ethylene carbonate (1,3-dioxolan-2-one) or cyclic propylene carbonate (4-methyl-1,3-dioxolan-2-one) is prepared, for example, by reaction of carbon dioxide with ethylene oxide or propylene oxide. A collation of suitable cyclic carbonates is collated in the scientific review article by G. Rodicki in Prog. Polym. Sci. 29 (2000) p. 259-342, for example in table 1.

In one embodiment of the process of the invention, the cyclic carbonate has the following structure of formula (VII):

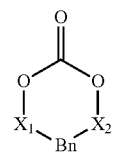

(VII)

where $X_1$ and/or $X_2$ is a $CH_2$ group
B is a direct bond between $X_1$ and $X_2$, substituted alkyl, unsubstituted alkyl, substituted O-alkyl, or unsubstituted O-alkyl,
and n=0, for a direct bond between $X_1$ and $X_2$, and a natural number >0 for
substituted alkyl, unsubstituted alkyl, substituted O-alkyl, or unsubstituted O-alkyl.

Preferably, $X_1$ and $X_2$ in formula (VII) are a $CH_2$ group and B is a direct bond between $X_1$ and $X_2$ and n=0, resulting in cyclic ethylene carbonate as cyclic carbonate.

In a particularly preferred embodiment of the process of the invention, the cyclic carbonate is one or more compounds and is selected from the group consisting of 4-methyl-1,3-dioxolan-2-one (propylene carbonate), 1,3-dioxolan-2-one (ethylene carbonate), 1,3-dioxan-2-one and 5,5-dimethyl-1,3-dioxan-2-one, preferably 1,3-dioxolan-2-one (ethylene carbonate).

In a preferred embodiment of the process of the invention, the molar ratio between cyclic carbonate and the hydroxyl end groups of the polyoxyalkylene polyol, preferably the hydroxyl end groups of the polyether polyol, is 1:1 to 20:1, preferably from 3:1 to 10:1 and more preferably from 5:1 to 9:1.

In one embodiment of the process of the invention, the preparation of the polyoxyalkylenecarbonate polyol, preferably the polyethercarbonate polyol, is conducted by reacting the polyoxyalkylene polyol, preferably the polyether polyol, with the cyclic carbonate in the presence of an amine catalyst, in the absence of alkylene oxides. This reaction in the absence of alkylene oxides is advantageous since there is no need to use any toxic alkylene oxide, usually gaseous under reaction conditions, especially ethylene oxide, since this can simplify the plant construction and can obviate the need for extensive safety devices.

In one embodiment of the process of the invention, the amine catalyst used is selected from the group comprising:
(A) amines of the general formula (VIII):

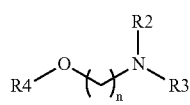
(VIII)

where:
R2 and R3 are independently hydrogen, alkyl or aryl; or
R2 and R3 together with the nitrogen atom bearing them form an aliphatic, unsaturated or aromatic heterocycle;
n is an integer from 1 to 10;
R4 is hydrogen, alkyl or aryl; or
R4 is —(CH$_2$)$_x$—N(R41)(R42) where:
R41 and R42 are independently hydrogen, alkyl or aryl; or
R41 and R42 together with the nitrogen atom bearing them form an aliphatic, unsaturated or aromatic heterocycle;
x is an integer from 1 to 10;
(B) amines of the general formula (IX):

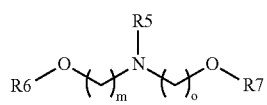
(IX)

where:
R5 is hydrogen, alkyl or aryl;
R6 and R7 are independently hydrogen, alkyl or aryl;
m and o are independently an integer from 1 to 10;
and/or:
(C) 1,8-diazabicyclo[5.4.0]undec-7-ene (DBU), 1,5,7-triazabicyclo[4.4.0]dec-5-ene (TBD), 1,4-diazabicyclo[2.2.2]octane (DABCO), dialkylbenzylamine, dimethylpiperazine, 2,2'-dimorpholinyldiethyl ether and/or pyridine.

In a preferred embodiment of the process of the invention, the amine catalyst is one or more compound(s) and is selected from the group consisting of trimethylamine, triethylenediamine, tripropylamine, tributylamine, tripentylamine, trihexylamine, triphenylamine, dimethylethylamine, N,N-dimethylcyclohexylamine, tetramethylenediamine, 1-methyl-4-dimethylaminoethylpiperazine, triethylamine, tripropylamine, tributylamine, dimethylbutylamine, N,N-dimethylbenzylamine, N,N-dimethylcyclohexylamine, N,N',N"-tris(dimethylaminopropyl)hexahydrotriazine, dimethylaminopropylformamide, N,N,N',N'-tetramethylethylenediamine, N,N,N',N'-tetramethylbutanediamine, tetramethylhexanediamine, pentamethyldiethylenetriamine, tetramethyldiaminoethyl ether, dimethylpiperazine, 1,2-dimethylimidazole, 1-azabicyclo[3.3.0]octane, bis(dimethylaminopropyl)urea, bis(dimethylaminoethyl) ether, N-methylmorpholine, N-ethylmorpholine, N-cyclohexylmorpholine, 2,3-dimethyl-3,4,5,6-tetrahydropyrimidine, triethanolamine, diethanolamine, triisopropanolamine, N-methyldiethanolamine, N-ethyldiethanolamine, dimethylethanolamine, 1,8-diazabicyclo[5.4.0]undec-7-ene (DBU), 1,5,7-triazabicyclo[4.4.0]dec-5-ene (TBD), 1,4-diazabicyclo[2.2.2]octane (DABCO), imidazole, 1-methylimidazole, 2-methylimidazole, 4(5)-methylimidazole, 2,4(5)-dimethylimidazole, 1-ethylimidazole, 2-ethylimidazole, 1-phenylimidazole, 2-phenylimidazole, 4(5)-phenylimidazole and N,N-dimethylaminopyridine, guanidine, 1,1,3,3-tetramethylguanidine, pyridine, 1-azanaphthalene (quinoline), N-methylpiperidine, N-methylmorpholine, N,N'-dimethylpiperazine and N,N-dimethylaniline, preferably 1,8-diazabicyclo[5.4.0]undec-7-ene (DBU), 1,5,7-triazabicyclo[4.4.0]dec-5-ene (TBD), 1,4-diazabicyclo[2.2.2]octane (DABCO), more preferably 1,8-diazabicyclo[5.4.0]undec-7-ene (DBU).

In one embodiment of the process of the invention, the amine catalyst is used in an amount of 0.001 mol % to 2 mol %, preferably of 0.003 to 1.5 mol % and more preferably of 0.005 to 1.0 mol %, based on the amount of cyclic carbonate.

In accordance with the customary definition in the art, a solvent is understood to mean one or more compound(s) that dissolve(s) the cyclic carbonate or the polyoxyalkylene polyol, preferably the polyether polyol, and/or the amine catalyst, but without itself/themselves reacting with the cyclic carbonate, the polyoxyalkylene polyol, preferably the polyether polyol, and/or the amine catalyst.

In one embodiment, the process of the invention is performed without addition of a solvent, such that there is no need to remove this solvent in an additional process step after the preparation of the polyalkylenecarbonate polyol, preferably the polyethercarbonate polyol. Solvent residues resulting from the preparation of the cyclic carbonate, of the polyoxyalkylene polyol and/or of the amine catalyst or solvent impurities in the cyclic carbonate, in the polyoxyalkylene polyol, preferably in the polyether polyol, and/or in the amine catalyst, by contrast, are encompassed by the solvent-free process of the invention.

In one embodiment of the process of the invention, the polyoxyalkylene polyol, preferably the polyether polyol, is reacted with the cyclic carbonate in the presence of the amine catalyst at temperatures of 50 to 220° C., preferably of 100 to 200° C. and more preferably of 140 to 180° C.

In one embodiment of the process of the invention, the cyclic carbonate is added continuously or stepwise to the polyoxyalkylene polyol, preferably to the polyether polyol, and converted to the polyoxyalkylenecarbonate polyol (semi-batchwise mode with continuous or stepwise addition of carbonate), with the addition temperature of the cyclic carbonate and the reaction temperature being the same. It is preferably possible here to initially charged amine catalyst together with the polyoxyalkylene polyol, preferably with polyether polyol, and then to react the mixture with the cyclic carbonate and/or to add the amine continuously or stepwise with the cyclic carbonate. It is preferable to initially charge the amine catalyst together with the polyoxyalkylene polyol, preferably the polyether polyol.

In the process of the invention, continuous addition of the cyclic carbonate is understood to mean a volume flow rate of the cyclic carbonate of >0 ml/min, where the volume flow rate may be constant or may vary during this step (continuous addition of cyclic carbonate).

In an alternative embodiment of the process of the invention, the cyclic carbonate is added stepwise to the polyoxyalkylene polyol, preferably to the polyether polyol, and then converted to the polyoxyalkylenecarbonate polyol, preferably to the polyethercarbonate polyols (stepwise addition of cyclic carbonate).

In the process of the invention, stepwise addition of the cyclic carbonate is understood to mean at least the addition of the total amount of the cyclic carbonate in two or more discrete portions of the cyclic carbonate, where the volume flow rate of the cyclic carbonate between the two or more discrete portions is 0 ml/min and wherein the volume flow rate of the cyclic carbonate during a discrete portion may be constant or may vary but is >0 ml/min.

In an alternative embodiment, the polyoxyalkylene polyol, preferably the polyether polyol, and the cyclic carbonate are mixed and then the mixture is converted to the polyoxyalkylenecarbonate polyol, preferably to the polyethercarbonate polyol, where the mixing temperature is lower than the reaction temperature (batchwise mode). It is possible here to initially charge the amine catalyst together with the polyoxyalkylene polyol, preferably the polyether polyol, and the cyclic carbonate, and then to convert the mixture to the polyoxyalkylenecarbonate polyol, preferably to the polyethercarbonate polyol, and to add the amine continuously and or stepwise. It is preferable to initially charge the amine catalyst together with the polyoxyalkylene polyol, preferably the polyether polyol, and the cyclic carbonate.

In a further, alternative embodiment, the polyoxyalkylene polyol, preferably the polyether polyol, the cyclic and amine catalyst are mixed and reacted with one another continuously, while the polyoxyalkylenecarbonate polyol product, preferably the polyethercarbonate polyol product, is removed continuously, for example in a stirred reactor or continuous stirred tank reactor, which corresponds to a fully continuous preparation process for the polyoxyalkylenecarbonate polyol, preferably for the polyethercarbonate polyol (fully continuous mode).

The present invention further provides a polyethercarbonate polyol obtainable by the process of the invention, comprising a polyether block (A) and at least one polyethercarbonate block (B), wherein the proportion by weight of CO2 in the polyethercarbonate polyol is ≤4% by weight, preferably ≤3% by weight, and wherein the polyethercarbonate polyol has a proportion of ≥65% primary OH end groups based on the sum total of primary and secondary OH end groups, wherein the primary OH end groups and the proportion by weight of CO2 have been determined by means of 1H NMR spectroscopy as disclosed in the experimental.

The present invention further provides a process for preparing a polyurethane by reaction of the polyoxyalkylenecarbonate polyol of the invention, preferably the polyethercarbonate polyol, with a polyisocyanate.

The polyisocyanate may be an aliphatic or aromatic polyisocyanate. Examples are butylene 1,4-diisocyanate, pentane 1,5-diisocyanate, hexamethylene 1,6-diisocyanate (HDI) or their dimers, trimers, pentamers, heptamers or nonamers or mixtures thereof, isophorone diisocyanate (IPDI), 2,2,4- and/or 2,4,4-trimethylhexamethylene diisocyanate, isomeric bis(4,4'-isocyanatocyclohexyl)methanes or mixtures thereof having any desired isomer content, cyclohexylene 1,4-diisocyanate, phenylene 1,4-diisocyanate, tolylene 2,4- and/or 2,6-diisocyanate (TDI), naphthylene 1,5-diisocyanate, diphenylmethane 2,2'- and/or 2,4'- and/or 4,4'-diisocyanate (MDI) and/or higher homologs (polymeric MDI), 1,3- and/or 1,4-bis(2-isocyanatoprop-2-yl)benzene (TMXDI), 1,3-bis(isocyanatomethyl)benzene (XDI), and alkyl 2,6-diisocyanatohexanoates (lysine diisocyanates) having C1 to C6 alkyl groups.

In addition to the abovementioned polyisocyanates, it is also possible to include proportions of modified diisocyanates having a uretdione, isocyanurate, urethane, carbodiimide, uretonimine, allophanate, biuret, amide, iminooxadiazinedione and/or oxadiazinetrione structure and also unmodified polyisocyanate having more than 2 NCO groups per molecule, for example 4-isocyanatomethyl-1,8-octane diisocyanate (nonane triisocyanate) or triphenylmethane 4,4',4''-triisocyanate.

EXAMPLES

The present invention is more particularly elucidated with reference to the figures and examples which follow but without being limited thereto.
Starting Materials Used
Cyclic Carbonates
    1,3-dioxolan-2-one (99+%, Acros Organics)
Catalysts
    1,8-diazabicyclo[5.4.0]undec-7-ene (DBU) (98%, Aldrich Chemistry)
    1,5,7-triazabicyclo[4.4.0]dec-5-ene (TBD) (98%, Aldrich Chemistry)
    DMC catalyst prepared in accordance with example 6 of WO 01/80994 A1
    potassium orthovanadate ($K_3VO_4$) (99.9%, Alfa Aesar)
Polyoxyalkylene Polyol (Polyether Polyol)
    Polyether polyol A was prepared using DMC catalysis as follows:
    A 20 l pressure reactor was initially charged under nitrogen with 1739.3 g of a poly(oxypropylene) triol having an OH number of 233 mg KOH/g and 0.367 g of DMC catalyst (prepared in accordance with example 6 of WO 01/80994 A1). The reactor was heated to 130° C., inertized by three times evacuating to 100 mbar (absolute) and repeated charging with nitrogen, and then stripping was performed for 30 min at 100 mbar and 130° C. with passage of nitrogen through the reactor. A mixture of 9256 g of propylene oxide and 1028 g of ethylene oxide was then metered in at 130° C. within three hours. After further reaction time at 130° C. until the pressure in the reactor was constant, volatile constituents were distilled off under reduced pressure at 90° C. for 30 min and then the reaction mixture was cooled to room temperature. The OH number of the product was 34.3 mg KOH/g, the viscosity 974 mPas, the number-average molecular weight $M_n$ 6665 g/mol, the polydispersity 1.03, and the proportion of primary hydroxyl end groups 18%.
Description of the Methods:
Gel Permeation Chromatography (GPC):
    The number-average molecular weight $M_n$, the weight-average molecular weight $M_w$ and the polydispersity ($M_w/M_n$) of the products were determined by means of gel permeation chromatography (GPC). The procedure of DIN 55672-1 was followed: "Gel permeation chromatography, Part 1—Tetrahydrofuran as eluent" (SECurity GPC System from PSS Polymer Service, flow rate 1.0 ml/min; columns: 2×PSS SDV linear M, 8×300 mm, 5 µm; RID detector). Polystyrene samples of known molar mass were used for calibration.
$^1H$ and $^{13}C$ NMR Spectroscopy
    Determination of the molar proportion of primary OH groups: by means of $^1H$ (Bruker AV III HD 600, 600 MHz, deuterochloroform) or $^{13}C$ NMR (Bruker AV III HD 600, 151 MHz, deuterochloroform):
    To determine the content of primary OH groups, the polyol samples were first peracetylated.

This was done using the following peracetylation mixture:
9.4 g of acetic anhydride p.a.
1.6 g of acetic acid p.a.
100 ml of pyridine p.a.

For the peracetylation reaction, 10 g of polyol (polyoxyalkylene polyol or polyoxyalkylenecarbonate polyol) were weighed into a 300 ml flanged Erlenmeyer flask. The volume of peracetylation mixture was guided by the OH number of the polyol to be peracetylated, rounding the OH number of the polyol up to the next multiple of 10 (based in each case on 10 g of polyol); for every 10 mg KOH/g, 10 ml of peracetylation mixture are then added. For example, 50 ml of peracetylation mixture were correspondingly added to the sample of 10 g of a polyol having an OH number of 45.1 mg KOH/g.

After the addition of glass boiling chips, the flanged Erlenmeyer flask was provided with a riser tube (air cooler) and the sample was boiled under gentle reflux for 75 min. The sample mixture was then transferred into a 500 ml round-bottom flask, and volatile constituents (essentially pyridine, acetic acid and excess acetic anhydride) were distilled off at 80° C. and 10 mbar (absolute) over a period of 30 min. The distillation residue was then admixed three times with 100 ml each time of cyclohexane (toluene was used as an alternative in the cases in which the distillation residue did not dissolve in cyclohexane), and volatile constituents of the sample were removed at 100° C. and 10 mbar (absolute) for one hour.

For the determination of the molar proportions of primary and secondary OH end groups in the polyol, the sample thus prepared was dissolved in deuterated chloroform and analyzed using $^1$H NMR (Bruker AV III HD 600, 600 MHz) or $^{13}$C NMR (Bruker AV III HD 600, 151 MHz). The relevant resonances in the $^1$H NMR (based on TMS=0 ppm) are as follows:

Methyl signal of a peracetylated secondary OH end group: 2.04 ppm
Methyl signal of a peracetylated primary OH end group: 2.08 ppm The molar proportion of secondary and primary OH end groups is then found as follows:

Proportion of secondary OH end groups (CH—OH)=
F(2.04)/(F(2.04)+F(2.08))·100%   (X)

Proportion of primary OH end groups (CH$_2$—OH)=
F(2.08)/(F(2.04)+F(2.08))·100%   (XI)

In the formulae (X) and (XI), F represents the area of the resonances at 2.04 ppm and 2.08 ppm respectively.

The relevant resonances in the $^{13}$C NMR (based on TMS=0 ppm) are as follows:

Methyl signal of a peracetylated secondary OH end group: 21.3 ppm
Methyl signal of a peracetylated primary OH end group: 20.9 ppm The molar proportion of secondary and primary OH end groups is then found as follows:

Proportion of secondary OH end groups (CH—OH)=
F(21.3)/(F(21.3)+F(20.9))·100%   (XII)

Proportion of primary OH and groups (CH$_2$—OH)=
F(20.9)/(F(21.3)+F(20.9))·100%   (XIII)

In the formulae (XII) and (XIII), F represents the area of the resonances at 21.3 ppm and 20.9 ppm respectively.

The relative composition of the polyoxyalkylenecarbonate polyols was determined by means of 1H NMR (Bruker AV III HD 600, 600 MHz, deuterochloroform). The relevant resonances in the 1H NMR spectrum (based on TMS=0 ppm) are as follows:

For remaining 1,3-dioxolan-2-one: signal at 4.53 ppm
For remaining 4-methyl-1,3-dioxolan-2-one: signal at 1.51-1.49 ppm
For linear propyl carbonate units incorporated in the polyoxyalkylenecarbonate polyol: resonances at 4.8-4.95 ppm
For linear ethylene carbonate units incorporated in the polyoxyalkylenecarbonate polyol: resonances at 4.2-4.35 ppm
For polypropylene oxide units incorporated in the polyoxyalkylenecarbonate polyol: resonances at 1.1 ppm
For polyethylene oxide units incorporated in the polyoxyalkylenecarbonate polyol: the remaining signal components in the range of 3.0-4.2 ppm The proportions by weight (in % by weight) of the components in the reaction mixture are calculated by the formula (XIV) to (XIX) as follows:

Unconverted 1,3-dioxolan-2-one (cEC):

$$cEC_{wt\%} = \frac{[F(4.53)]}{4} \cdot \frac{88}{N} \cdot 100\% \quad \text{(XIV)}$$

Unconverted 4-methyl-1,3-dioxolan-2-one (cPC):

$$cPC_{wt\%} = \frac{[F(1.51-1.49)]}{3} \cdot \frac{102}{N} \cdot 100\% \quad \text{(XV)}$$

Polymer-bound linear propylene carbonate units (lPC):

$$lPC_{wt\%} = \left[F(4.8-4.95) - \frac{[F(1.51-1.49)]}{3}\right] \cdot \frac{102}{N} \cdot 100\% \quad \text{(XVI)}$$

Polymer-bound linear ethylene carbonate units (lEC):

$$lEC_{wt\%} = \frac{[F(4.2-4.35)]}{4} \cdot \frac{88}{N} \cdot 100\% \quad \text{(XVII)}$$

Polymer-bound polypropylene oxide units (PPO):

$$PPO_{wt\%} = \frac{[F(1.1)]}{3} \cdot \frac{58}{N} \cdot 100\% \quad \text{(XVIII)}$$

Polymer-bound polyethylene oxide units (PEO):

$$PEO_{wt\%} = \quad \text{(XIX)}$$
$$\frac{[F(3.0-4.2) - F(1.1) - F(1.51-1.49) - 2 \cdot F(4.8-4.95)]}{4} \cdot \frac{44}{N} \cdot 100\%$$

where the value of D ("denominator" D) is calculated by formula (XX):

$$D = \frac{[F(4.53)]}{4} \cdot 88 + \quad \text{(XX)}$$
$$\frac{F(1.51-1.49)}{3} \cdot 102 + \left[F(4.8-4.95) - \frac{[F(1.51-1.49)]}{3}\right] \cdot 102 +$$

-continued $$\frac{[F(4.2-4.35)]}{4} \cdot 88 + \frac{[F(1.1)]}{3} \cdot 58 +$$

$$\frac{[F(3.0-4.2)-F(1.1)-F(1.51-1.49)-2 \cdot F(4.8-4.95)]}{4} \cdot 44$$

and the following abbreviations are used:
F(4.53)=area of resonance at 4.53 ppm for 1,3-dioxolan-2-one (corresponding to four protons)
F(1.51-1.49)=area of the resonance at 1.51-1.49 ppm for 4-methyl-1,3-dioxolan-2-one (corresponding to three protons)
F(4.8-4.95)=area of the resonance at 4.8-4.95 ppm for linear propylene carbonate units in the polyoxyalkylenecarbonate polyols (corresponding to one proton)
F(4.2-4.35)=area of the resonance at 4.2-4.35 ppm for linear ethylene carbonate units in the polyoxyalkylenecarbonate polyols (corresponding to four protons)
F(1.1)=area of the resonance at 1.1 ppm for polypropylene oxide units in the polyoxyalkylenecarbonate polyol (corresponding to three protons)
F(3.0-4.2)=area of the remaining signal components in the range of 3.0-4.2 ppm for polyethylene oxide units in the polyoxyalkylenecarbonate polyol (corresponding to four protons)

Taking account of the relative intensities, by the following formula (XXI), the proportion by weight (in % by weight) of $CO_2$ in the polyoxyalkylene carbonate polyol ($CO_2$ wt %) was calculated:

$$CO_{2_{wt\%}} = \frac{\left[lEC_{wt\%} \cdot \frac{44}{88} + lPC_{wt\%} \cdot \frac{44}{102}\right]}{P} * 100\% \quad (XXI)$$

where the value for $P_{wt\ \%}$ ("polymer" P) is calculated by formula (XXII) and reflects the polymer content (i.e. the proportion by weight of the polyoxyalkylenecarbonate polyols) (in % by weight) in the reaction mixture:

$$P_{wt\ \%} = lEC_{wt\ \%} + lPC_{wt\ \%} + PPO_{wt\ \%} + PEO_{wt\ \%} \quad (XXII)$$

In formula (XXI), the factor 44 results from the molar mass of ethylene oxide (molar mass 44 g/mol), the factor 88 from the sum total of the molar masses of $CO_2$ (molar mass 44 g/mol) and of ethylene oxide, and the factor 102 from the sum total of the molar masses of $CO_2$ and of propylene oxide (molar mass 58 g/mol).

OH Numbers

OH numbers were determined in accordance with the procedure of DIN 53240.

Viscosity

Viscosity was determined by rotary viscometer (Physica MCR 51, manufacturer: Anton Paar) by the method of DIN 53018.

Example 1

A 500 milliliter three-neck flask (equipped with reflux condenser, temperature sensor, nitrogen feed and gas exit/gas outlet with bubble counter) was initially charged with 200 g of polyether polyol A and heated to 100° C. Subsequently, 75.4 g of 1,3-dioxolan-2-one (molar ratio of 1,3-dioxolan one/hydroxyl end groups of polyether polyol A: 7/1) was added, and the gas space in the flask was purged with nitrogen at 100° C. for 20 minutes. Thereafter, 0.65 g of 1,8-diazabicyclo[5.4.0]undec-7-ene (DBU) (0.5 mol % based on the 1,3-dioxolan-2-one used) was added and the mixture was heated up stepwise to 170° C. The resultant gas stream was observed by means of a bubble counter connected to the reflux condenser and discharged. The reaction mixture was stirred at 170° C. for 5 hours and then cooled to room temperature. The OH number of the product was 34 mg KOH/g, the viscosity 5470 mPas, and the proportion of primary hydroxyl end groups 71%. By NMR spectroscopy, a proportion by weight of $CO_2$ in the polyethercarbonate polyol of 2.44% was determined.

Example 2

A 500 milliliter three-neck flask (equipped with reflux condenser, dropping funnel, temperature sensor, nitrogen feed and gas exit/gas outlet with bubble counter) was initially charged with 200 g of polyether polyol A and heated to 130° C., and the gas space in the flask was purged with nitrogen for 20 minutes. 0.65 g of 1,8-diazabicyclo[5.4.0] undec-7-ene (DBU) (0.5 mol % based on the amount of the 1,3-dioxolan-2-one used) was added, and then, by dropping funnel, 75.4 g of 1,3-dioxolan-2-one (molar ratio of 1,3-dioxolan-2-one/hydroxyl end groups of polyether polyol A: 7/1) was added (about 15 g/h). With commencement of the addition of the 1,3-dioxolan-2-one, the reaction mixture was heated to 170° C. and stirred at 170° C. for 5 hours. The resultant gas stream was observed by means of a bubble counter connected to the reflux condenser and discharged. Subsequently, the reaction mixture was cooled to room temperature. The OH number of the product was 31 mg KOH/g, the viscosity 4175 mPas, and the proportion of primary hydroxyl end groups 72%. By NMR spectroscopy, a proportion by weight of $CO_2$ in the polyethercarbonate polyol of 2.01% was determined.

Example 3

A 500 milliliter three-neck flask (equipped with reflux condenser, temperature sensor, nitrogen feed and gas exit/gas outlet with bubble counter) was initially charged with 200 g of polyether polyol A and heated to 130° C. Subsequently, 75.4 g of 1,3-dioxolan-2-one (molar ratio of 1,3-dioxolan-2-one/hydroxyl end groups of polyether polyol A: 7/1) and 0.65 g of 1,8-diazabicyclo[5.4.0]undec-7-ene (DBU) (0.5 mol % based on the amount of the 1,3-dioxolan-2-one used) were added. The reaction mixture was heated up to 170° C. stepwise while passing nitrogen through, stirred at 170° C. for 5 hours while passing nitrogen through, and then cooled down to room temperature. The OH number of the product was 33 mg KOH/g, the viscosity 7550 mPas, and the proportion of primary hydroxyl end groups 73%. By NMR spectroscopy, a proportion by weight of $CO_2$ in the polyethercarbonate polyol of 2.38% was determined.

Example 4

A 500 milliliter three-neck flask (equipped with reflux condenser, dropping funnel, temperature sensor, nitrogen feed and gas exit/gas outlet with bubble counter) was initially charged with 200 g of polyether polyol A and heated to 130° C. Subsequently, 0.65 g of 1,8-diazabicyclo[5.4.0] undec-7-ene (DBU) (0.5 mol % based on the amount of the 1,3-dioxolan-2-one used) was added, and, by dropping funnel, 75.4 g of 1,3-dioxolan-2-one (molar ratio of 1,3-dioxolan-2-one/hydroxyl end groups of polyether polyol A: 7/1) was added (about 15 g/h). With commencement of the addition of the 1,3-dioxolan-2-one, the reaction mixture was heated to 170° C. while passing nitrogen through and stirred at 170° C. for 5 hours while passing nitrogen through. Subsequently, the reaction mixture was cooled to room temperature. The OH number of the product was 29 mg KOH/g, the viscosity 6225 mPas, and the proportion of primary hydroxyl end groups 72%. By NMR spectroscopy, a proportion by weight of $CO_2$ in the polyethercarbonate polyol of 1.99% was determined.

Example 5

A 500 milliliter three-neck flask (equipped with reflux condenser and temperature sensor) was initially charged with 200 g of polyether polyol A and heated to 130° C. Subsequently, 75.4 g of 1,3-dioxolan-2-one (molar ratio of 1,3-dioxolan-2-one/hydroxyl end groups of polyether polyol A: 7/1) and 0.65 g of 1,8-diazabicyclo[5.4.0]undec-7-ene (DBU) (0.5 mol % based on the amount of the 1,3-dioxolan-2-one used) were added. The reaction mixture was heated up to 170° C. stepwise at 700 mbar, stirred at 170° C. and 700 mbar for 5 hours, and then cooled down to room temperature. The OH number of the product was 31 mg KOH/g, the viscosity 7450 mPas, and the proportion of primary hydroxyl end groups 73%. By NMR spectroscopy, a proportion by weight of $CO_2$ in the polyethercarbonate polyol of 2.50% was determined.

Example 6

A 500 milliliter three-neck flask (equipped with reflux condenser, temperature sensor, nitrogen feed and gas exit/gas outlet with bubble counter) was initially charged with 200 g of polyether polyol A and heated to 130° C. Subsequently, 75.4 g of 1,3-dioxolan-2-one (molar ratio of 1,3-dioxolan one/hydroxyl end groups of polyether polyol A: 7/1) was added, and the gas space in the flask was purged with nitrogen at 130° C. for 20 minutes. Thereafter, 0.60 g of 1,5,7-triazabicyclo[4.4.0]dec ene (TBD) (0.5 mol % based on the 1,3-dioxolan-2-one used) was added and the mixture was heated up stepwise to 170° C. The resultant gas stream was observed by means of a bubble counter connected to the reflux condenser and discharged. The reaction mixture was stirred at 170° C. for 5 hours and then cooled to room temperature. The OH number of the product was 32 mg KOH/g, the viscosity 6975 mPas, and the proportion of primary hydroxyl end groups 73%. By NMR spectroscopy, a proportion by weight of $CO_2$ in the polyethercarbonate polyol of 2.30% was determined.

Example 7 (Comparative Example)

A 2 liter stainless steel reactor was initially charged with 200 g of the polyether polyol A and heated to 130° C. The reactor was inertized by three times evacuating to 100 mbar (absolute) and repeatedly charging with nitrogen. 75.0 g of 1,3-dioxolan-2-one (molar ratio of 1,3-dioxolan-2-one/hydroxyl end groups of polyether polyol A: 7/1) was added, and the reaction mixture was stirred at 170° C. for 5 hours. The resultant gas stream was observed by means of a bubble counter connected to the reactor and discharged. Subsequently, the reaction mixture was cooled to room temperature. The OH number of the product was 31 mg KOH/g, the viscosity (at 50° C.) 236 mPas, and the proportion of primary hydroxyl end groups 12%. By NMR spectroscopy, a proportion by weight of $CO_2$ in the polyethercarbonate polyol of 0.36% was determined.

Example 8 (Comparative Example)

A 2 liter stainless steel reactor was initially charged with 200 g of the polyether polyol A and heated to 130° C. The reactor was inertized by three times evacuating to 100 mbar (absolute) and repeatedly charging with nitrogen. 75.0 g of 1,3-dioxolan-2-one (molar ratio of 1,3-dioxolan-2-one/hydroxyl end groups of polyether polyol A: 7/1) was added, and the mixture was heated to 170° C. 130 g of propylene oxide was added, and the mixture was stirred at 170° C. for 5 hours. Subsequently, the reaction mixture was cooled to room temperature. The OH number of the product was 24 mg KOH/g, the viscosity 2510 mPas, and the proportion of primary hydroxyl end groups 17%. By NMR spectroscopy, a proportion by weight of $CO_2$ in the polyethercarbonate polyol of 0.51% was determined.

Example 9 (Comparative Example)

A 500 milliliter three-neck flask (equipped with reflux condenser, temperature sensor, nitrogen feed and gas exit/gas outlet with bubble counter) was initially charged with 200 g of polyether polyol A and heated to 120° C. Subsequently, 75.4 g of 1,3-dioxolan-2-one (molar ratio of 1,3-dioxolan-2-one/hydroxyl end groups of polyether polyol A: 7/1) was added, and the gas space in the flask was purged with nitrogen at 120° C. for 20 minutes. Thereafter, 0.99 g of potassium orthovanadate ($K_3VO_4$) (0.5 mol % based on the 1,3-dioxolan-2-one used) was added and the mixture was heated up stepwise to 170° C. The resultant gas stream was observed by means of a bubble counter connected to the reflux condenser and discharged. The reaction mixture was stirred at 170° C. for 5 hours and then cooled to room temperature. The OH number of the product was 40 mg KOH/g, the viscosity 12750 mPas, and the proportion of primary hydroxyl end groups 76%. By NMR spectroscopy, a proportion by weight of $CO_2$ in the polyethercarbonate polyol of 4.26% was determined.

TABLE 1

Comparison of experiments 1 to 9.

| Experiment | Polyoxyalkylene polyol | Carbonate[a] | Alkylene oxide[b] | Catalyst[c] | x(cat) [mol %][d] | Carbonate/hydroxyl end groups [mol/mol] | Addition of carbonate[e] | OH number [mg KOH/g] | Viscosity (25° C.) [mPa*s] | Primary OH [%] | $CO_2$ in the polyethercarbonate polyol [% by wt.] |
|---|---|---|---|---|---|---|---|---|---|---|---|
| 1 | Polyether polyol A | EC | — | DBU | 0.5 | 7 | batch | 34 | 5470 | 71 | 2.44 |
| 2 | Polyether polyol A | EC | — | DBU | 0.5 | 7 | cont. | 31 | 4175 | 72 | 2.01 |
| 3 | Polyether polyol A | EC | — | DBU | 0.5 | 7 | batch | 33 | 7550 | 73 | 2.38 |

TABLE 1-continued

Comparison of experiments 1 to 9.

| Experiment | Polyoxyalkylene polyol | Carbonate[a] | Alkylene oxide [b] | Catalyst [c] | x(cat) [mol %][d] | Carbonate/hydroxyl end groups [mol/mol] | Addition of carbonate [e] | OH number [mg KOH/g] | Viscosity (25° C.) [mPa*s] | Primary OH [%] | $CO_2$ in the polyethercarbonate polyol [% by wt.] |
|---|---|---|---|---|---|---|---|---|---|---|---|
| 4 | Polyether polyol A | EC | — | DBU | 0.5 | 7 | cont. | 29 | 6225 | 72 | 1.99 |
| 5 | Polyether polyol A | EC | — | DBU | 0.5 | 7 | batch | 31 | 7450 | 73 | 2.50 |
| 6 | Polyether polyol A | EC | — | TBD | 0.5 | 7 | batch | 32 | 6975 | 73 | 2.30 |
| 7 (comp.) | Polyether polyol A | EC | — | $DMC_{act}$ | — | 7 | batch | 31 | 236 (50° C.) | 12 | 0.36 |
| 8 (comp.) | Polyether polyol A | EC | PO | $DMC_{act}$ | — | 7 | batch[f] | 24 | 2510 | 17 | 0.51 |
| 9 (comp.) | Polyether polyol A | EC | — | $K_3VO_4$ | 0.5 | 7 | batch | 40 | 12750 | 76 | 4.26 |

[a] 1,3-dioxolan-2-one (ethylene carbonate, EC)
[b] propylene oxide (PO)
[c] 1,8-diazabicyclo[5.4.0]undec-7-ene (DBU), 1,5,7-triazabicyclo[4.4.0]dec-5-ene (TBD); DMC catalyst present from the preparation of polyether polyol A ($DMC_{act}$), potassium orthovanadate ($K_3VO_4$)
[d] based on the amount of carbonate used
[e] carbonate addition: batchwise mode (batch); semi-batchwise mode with continuous carbonate addition (conti);
[f] carbonate addition in batchwise mode (batch) with continuous addition of the alkylene oxide (corresponding to teaching of WO2013/028437 A1)

The invention claimed is:

1. A process for preparing a polyoxyalkylenecarbonate polyol comprising reacting a polyoxyalkylene polyol with a cyclic carbonate in the presence of an amine catalyst.

2. The process as claimed in claim 1, wherein the number-average molar mass of the polyoxyalkylene polyol is ≥200 g/mol as determined by means of gel permeation chromatography (GPC).

3. The process as claimed in claim 1, wherein the molar ratio between cyclic carbonate and the hydroxyl end groups of the polyoxyalkylene polyol is from 1:1 to 20:1.

4. The process as claimed in claim 1, wherein the polyoxyalkylenecarbonate polyol is prepared in the absence of any alkylene oxide.

5. The process as claimed in claim 1, wherein the cyclic carbonate is selected from the group consisting of 4-methyl-1,3-dioxolan-2-one, 1,3-dioxolan-2-one, 1,3-dioxan-2-one, 5,5-dimethyl-1,3-dioxan-2-one, and mixtures thereof.

6. The process as claimed in claim 1, wherein the amine catalyst is selected from the group consisting of trimethylamine, triethylenediamine, tripropylamine, tributylamine, tripentylamine, trihexylamine, triphenylamine, dimethylethylamine, N,N-dimethylcyclohexylamine, tetramethylenediamine, 1-methyl-4-dimethylaminoethylpiperazine, triethylamine, tripropylamine, tributylamine, dimethylbutylamine, N,N-dimethylbenzylamine, N,N-dimethylcyclohexylamine, N,N',N"-tris(dimethylaminopropyl) hexahydrotriazine, dimethylaminopropylformamide, N,N,N',N'-tetramethylethylenediamine, N,N,N',N'-tetramethylbutanediamine, tetramethylhexanediamine, pentamethyldiethylenetriamine, tetramethyldiaminoethyl ether, dimethylpiperazine, 1,2-dimethylimidazole, 1-azabicyclo[3.3.0]octane, bis(dimethylaminopropyl) urea, bis(dimethylaminoethyl) ether, N-methylmorpholine, N-ethylmorpholine, N-cyclohexylmorpholine, 2,3-dimethyl-3,4,5,6-tetrahydropyrimidine, triethanolamine, diethanolamine, triisopropanolamine, N-methyldiethanolamine, N-ethyldiethanolamine, dimethylethanolamine, 1,8-diazabicyclo[5.4.0]undec-7-ene (DBU), 1,5,7-triazabicyclo[4.4.0]dec-5-ene (TBD), 1,4-diazabicyclo[2.2.2]octane (DABCO), imidazole, 1-methylimidazole, 2-methylimidazole, 4 (5)-methylimidazole, 2,4 (5)-dimethylimidazole, 1-ethylimidazole, 2-ethylimidazole, 1-phenylimidazole, 2-phenylimidazole, 4 (5)-phenylimidazole and N,N-dimethylaminopyridine, guanidine, 1,1,3,3-tetramethylguanidine, pyridine, 1-azanaphthalene (quinoline), N-methylpiperidine, N-methylmorpholine, N,N'-dimethylpiperazine, N,N-dimethylaniline, and mixtures thereof.

7. The process as claimed in claim 1, wherein the polyoxyalkylene polyol has a proportion of secondary OH end groups of at least 75%, based on the sum total of primary and secondary OH end groups, as determined by means of 1H NMR spectroscopy.

8. The process as claimed in claim 1, wherein the polyoxyalkylene polyol is a polyether polyol and/or polyethercarbonate polyol.

9. The process as claimed in claim 8, wherein the polyoxyalkylene polyol is a polyether polyol prepared by reaction of an H-functional starter substance with alkylene oxide in the presence of a double metal cyanide catalyst.

10. The process as claimed in claim 9, wherein the alkylene oxide is ethylene oxide and/or propylene oxide.

11. The process as claimed in claim 10, wherein the proportion by weight of propylene oxide is 80% by weight to 100% by weight based on the sum total of the masses of propylene oxide and of ethylene oxide metered in.

12. The process as claimed in claim 1, wherein the process is performed without addition of a solvent.

13. The process as claimed in claim 1, wherein the cyclic carbonate is added continuously or stepwise to the polyoxyalkylene polyol and is converted to the polyoxyalkylenecarbonate polyol.

* * * * *